Figure 1:
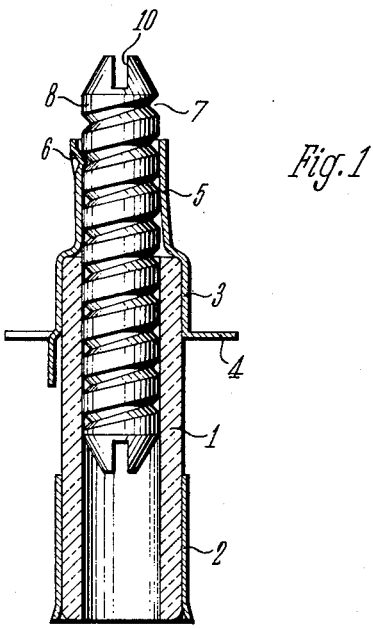

May 31, 1966  R. HOPT ET AL  3,253,477

TRIMMER CONDENSER

Filed Oct. 22, 1963

INVENTORS
Rudolf Hopt
Rudolf Mayer

BY Dicke & Craig

ATTORNEYS

United States Patent Office 3,253,477
Patented May 31, 1966

3,253,477
TRIMMER CONDENSER
Rudolf Hopt and Rudolf Mayer, Rottweil (Neckar), Germany, assignors to Firma R. & E. Hopt KG., Rottweil (Neckar), Germany
Filed Oct. 22, 1963, Ser. No. 318,021
Claims priority, application Germany, Nov. 5, 1962, H 47,327
6 Claims. (Cl. 74—424.8)

The invention relates to a trimmer condenser provided with an inner spindle in a ceramic sleeve and provided with a thread, being axially displaceable by a screwing movement, wherein a sheet metal cap is applied to one end of the sleeve which is connected electrically to the trimmer spindle. With these trimmers there is the problem of providing a radiation-proof closure between the trimmer spindle and the cap, which hinders the emission of high frequency stray radiation. Moreover, the spindle must be guided completely without play. With known trimmers a V-shaped spring wire clip is provided in the ceramic sleeve which engages the thread of the trimmer spindle and is intended to overcome the aforesaid problem. Apart from the fact that these trimmers leave something to be desired as regards the guiding of the trimmer spindle and the size of the contact surfaces, there is the serious disadvantage of this known trimmer that it cannot be produced completely automatically since the extremely small springs cannot be sorted and automatically inserted.

The invention avoids this disadvantage and consists in the fact that a sleeve portion of resilient conductive material is attached as an extension to the cap, which closely surrounds the spindle and in which depressions are formed engaging the spindle thread.

The particular advantage of the invention lies in the fact that the guiding of the threaded spindle is effected by the depressions in this extension. These depressions are distributed around the periphery of the extension and are offset relatively in the axial direction so that they all engage in the thread of the trimmer spindle. Two, three, four or more depressions can be provided. Obviously it is possible to make the number of depressions as high as required. Thereby there is obtained not only a reliable guiding but it is also impossible for the trimmer spindle to be pushed right through against the holding action and thus to lose its guiding, if the tuning, i.e., the adjustment of the trimmer, is effected carelessly. A further advantage of the invention lies in the fact that the section of the sleeve tightly surrounding the trimmer spindle and lying beyond the cap has an additional holding and an additional guide. There is obtained by this construction according to the invention a large surface contact, in contrast to the known trimmers referred to above in which the spring produces contact with the trimmer spindle at two points only.

The main advantage of the invention lies further in the fact that by the omission of a special V-shaped spring this trimmer can be produced completely automatically. The parts required by the production of the trimmer are all circular and can thus be easily sorted, automatically fed and automatically assembled.

The sleeve-like extension can be easily adapted to the particular purpose of use of the trimmer.

Finally a further advantage of the trimmer according to the invention lies in the fact that it is easily possible so to form the depressions that, according to a further embodiment of the invention, these depressions are pressed outwardly on engagement with the threads of the trimmer spindle. This has the advantage that the wall sections of the sleeve-like extension lying between the depressions are expanded and are thus forced yieldingly against the periphery of the trimmer spindle. Thereby any play and wear effects are avoided.

This embodiment of the invention can furthermore be so constructed that either the depressions are deeper than the threads, or the cone angle of the depressions is so great that the tip of the depression does not bear against the bottom of the thread but the depressions rest at two points beneath their tips against the thread flanks.

The depressions can be of circular section or may also embody thread segments running parallel to the threads.

The sleeve-like extension can in one embodiment of the invention be formed in one piece with the cap or this extension can be produced from a separate part and fastened to the ceramic sleeve by crimping folding or in other ways. Every embodiment of the invention has the advantage that the cap fastened to the ceramic sleeve can be constructed in the same way for all trimmer condensers and therefore can also be used for trimmers without the extension member. This embodiment of the invention has the further advantage that the extension can consist of another material than the cap, it can for example be formed of spring steel or beryllium steel or bronze, whereas the cap mounted on the ceramic sleeve can be produced from a cheaper material. The extension can be hardened or non-hardened, it can be superficially treated or non-treated and can be made longer or shorter according to the required purpose. Also the wall thickness of the extension and of the cap can be different.

If the extension is comparatively long, there may be provided outside of the region of the depressions engaging in the thread of the trimmer spindle, also further depressions which however are so constructed that they bridge over the threads and provide a large superficial contact and additionally guide the trimmer spindle. Both these depressions and also the first-named depressions also serve for adjustment of the magnitude of the frictional resistance which acts against rotation of the trimmer spindle.

Further features of the invention will be apparent from the following description of one constructional form of the invention in conjunction with the claims and the accompanying drawing. The individual features can be used on their own or several of them may be utilised in one embodiment of the invention.

Figure 2:
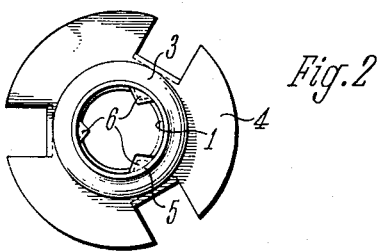
Figure 3:
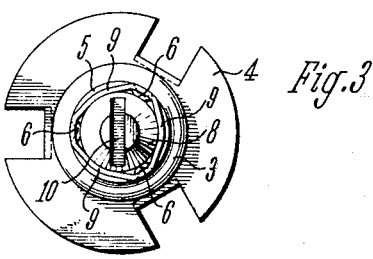

In the embodiment shown:
FIG. 1 is an embodiment of the invention in longitudinal section.
FIG. 2 is a plan of a trimmer without a spindle, and
FIG. 3 is a plan of the trimmer with the spindle inserted.

In the embodiment of the invention shown on the drawing the trimmer embodies a ceramic sleeve 1 which is provided at its live or "hot" end with a conductive coating 2. At the end connected to earth a cap 3 is fastened to the ceramic sleeve 1 which embodies a flange 4 for soldering or otherwise fastening the trimmer to a mounting plate or the like. The cap 3 embodies a sleeve-like extension 5 which embodies three depressions 6 near its forward edge which are distributed over the periphery of the sleeve and are offset axially one from the other so that they engage the thread 7 of a timmer spindle 8. The depression 6 are so formed that when they engage the thread of a trimmer spindle they are forced radially outwards so that the wall sections 9 of the extension 5 disposed between the depressions 6 are expanded and thus bear yieldingly against the periphery of the trimmer spindle 8 (FIG. 3).

The cone angle of the depressions 6 is greater than the flank angle of the thread 7 so that the depression 6 does not bear against the bottom of the thread but presses against the upper edges of the thread flanks.

By inserting a screwdriver or other suitable trimming tool in a slot 7 the outer end of the tirmmer spindle, the latter can be screwed more or less far into the ceramic sleeve 1 by rotation.

What we claim is:

1. An adjustable trimmer condenser comprising a ceramic sleeve having a smooth cylindrical interior, a metal spindle having a screw thread rotatable within said sleeve, said spindle being longitudinally adjustable within said sleeve and extending from one end thereof, guide means for the adjustment of said rotatable spindle comprising a sheet metal cap member secured to said one end and comprising a resilient tubular extension surrounding said spindle and spaced radially inwardly extending indentations on said tubular extension in engagement with said screw thread.

2. An adjustable trimmer condenser according to claim 1, wherein said engagement by said indentations with said screw thread is effective to force said indentations radially outwardly to thereby effect a bending of the portions of said resilient tubular extension intermediate said indentations into close engagement with said metal spindle.

3. An adjustment trimmer condenser according to claim 2, wherein said indentations are of greater radial extent than the depth of the spaces between adjacent turns of said screw thread.

4. An adjustable trimmer condenser according to claim 2, wherein said indentations engage only the radially upper side portions of said screw thread.

5. An adjustable trimmer condenser according to claim 1, wherein said indentations are cone-shaped, the cone angle being greater than the flank angle of said thread.

6. An adjustable trimmer condenser according to claim 1, wherein said sheet cap member is provided with flange securing means.

References Cited by the Examiner

UNITED STATES PATENTS

| 2,386,732 | 10/1945 | Wohlhieter | 317—249 X |
| 2,516,981 | 9/1950 | Hall | 317—249 |
| 2,824,480 | 2/1958 | Hotchkin | 317—249 X |

FOREIGN PATENTS 1,134,163   9/1962   Germany.

ROBERT K. SCHAEFER, *Primary Examiner.*

JOHN F. BURNS, *Examiner.*

ELLIOT A. GOLDBERG, *Assistant Examiner.*